(12) United States Patent
Diehl

(10) Patent No.: US 9,872,000 B2
(45) Date of Patent: Jan. 16, 2018

(54) SECOND SCREEN DEVICE AND SYSTEM

(71) Applicant: THOMSON LICENSING, Issy de Moulineaux (FR)

(72) Inventor: Eric Diehl, Issy (FR)

(73) Assignee: Thomson Licensing, Issy-les-Moulineaux (FR)

( * ) Notice: Subject to any disclaimer, the term of this patent is extended or adjusted under 35 U.S.C. 154(b) by 87 days.

(21) Appl. No.: 14/450,629

(22) Filed: Aug. 4, 2014

(65) Prior Publication Data

US 2015/0043891 A1 Feb. 12, 2015

(30) Foreign Application Priority Data

Aug. 9, 2013 (EP) .................................... 13306144
Nov. 26, 2013 (EP) .................................... 13306612

(51) Int. Cl.
*H04N 19/00* (2014.01)
*G06F 3/0484* (2013.01)
(Continued)

(52) U.S. Cl.
CPC ....... *H04N 7/26372* (2013.01); *G06F 3/0488* (2013.01); *G06F 3/04842* (2013.01); *G10L 19/018* (2013.01); *G11B 20/00086* (2013.01); *H04H 20/31* (2013.01); *H04H 60/33* (2013.01); *H04H 60/80* (2013.01); *H04N 19/467* (2014.11);
(Continued)

(58) Field of Classification Search
CPC . G06F 3/04842; G06F 3/0488; G10L 19/018; G11B 20/00086; H04H 20/31; H04H 2201/50; H04H 60/33; H04H 60/80; H04N 2005/91335; H04N 21/4122; H04N 21/4307; H04N 21/8358; H04N 21/8547; H04N 7/26372

USPC ................ 386/260, 291; 382/100, 145, 233; 713/176; 725/32, 61

See application file for complete search history.

(56) References Cited

U.S. PATENT DOCUMENTS 6,122,403 A * 9/2000 Rhoads ............. G06F 17/30876
382/233
6,737,957 B1 5/2004 Petrovic et al.
(Continued)

FOREIGN PATENT DOCUMENTS

WO WO2010054222 5/2010

OTHER PUBLICATIONS

Anonymous, "Automated Content Recognition creating content aware ecosystem", A white paper by Civolution, www.civolution.com, Sep. 2012, pp. 1-16.

*Primary Examiner* — Thai Tran
*Assistant Examiner* — Stephen Smith
(74) *Attorney, Agent, or Firm* — Myers Wolin LLC

(57) ABSTRACT

A second screen system comprises a first screen that renders a first content comprising watermarks of a first type and watermarks of a second type. The watermarks of the first type are captured by a second screen that reacts to these watermarks. The second screen displays information to a user and receives user input. The second screen also watermarks a second content with watermarks of the second type and renders the second content. A third device captures watermarks of the second type in both the first content and the second content. Since the watermarks embedded by the second screen can depend on the user's actions, the third device can indirectly react to the user's actions.

11 Claims, 2 Drawing Sheets

(51) Int. Cl.
*G06F 3/0488* (2013.01)
*G10L 19/018* (2013.01)
*G11B 20/00* (2006.01)
*H04H 20/31* (2008.01)
*H04H 60/33* (2008.01)
*H04N 21/8358* (2011.01)
*H04H 60/80* (2008.01)
*H04N 21/41* (2011.01)
*H04N 21/43* (2011.01)
*H04N 21/8547* (2011.01)
*H04N 19/467* (2014.01)
*H04N 5/913* (2006.01)

(52) U.S. Cl.
CPC ..... *H04N 21/4122* (2013.01); *H04N 21/4307* (2013.01); *H04N 21/8358* (2013.01); *H04N 21/8547* (2013.01); *H04H 2201/50* (2013.01); *H04N 2005/91335* (2013.01)

(56) References Cited

U.S. PATENT DOCUMENTS

| | | | | |
|---|---|---|---|---|
| 7,802,306 | B1* | 9/2010 | Adams | G06F 21/10 713/155 |
| 8,302,143 | B2 | 10/2012 | Meuninck | |
| 8,340,348 | B2 | 12/2012 | Petrovic et al. | |
| 8,838,977 | B2* | 9/2014 | Winograd | G06F 21/10 380/201 |
| 2001/0044899 | A1* | 11/2001 | Levy | G06F 17/30876 713/176 |
| 2002/0033844 | A1* | 3/2002 | Levy | G06F 21/10 715/744 |
| 2003/0012548 | A1* | 1/2003 | Levy | G06F 21/125 386/251 |
| 2004/0117629 | A1* | 6/2004 | Koto | G06T 1/0028 713/176 |
| 2005/0271246 | A1* | 12/2005 | Sharma | G06Q 20/3823 382/100 |
| 2006/0156003 | A1* | 7/2006 | Zhang | H04N 1/32144 713/176 |
| 2006/0239503 | A1* | 10/2006 | Petrovic | H04L 9/002 382/100 |
| 2007/0047763 | A1* | 3/2007 | Levy | G06F 21/10 382/100 |
| 2007/0076261 | A1* | 4/2007 | Ito | H04N 1/00846 358/3.28 |
| 2008/0040971 | A1 | 2/2008 | Ramos et al. | |
| 2008/0049971 | A1* | 2/2008 | Ramos | G06F 17/30026 382/100 |
| 2010/0058065 | A1* | 3/2010 | Celik | A63H 3/36 713/176 |
| 2010/0119208 | A1* | 5/2010 | Davis | H04N 5/765 386/291 |
| 2010/0226526 | A1* | 9/2010 | Modro | G06K 9/00577 382/100 |
| 2012/0154633 | A1* | 6/2012 | Rodriguez | H04M 1/72569 348/231.99 |
| 2012/0311623 | A1* | 12/2012 | Davis | H04N 5/765 725/18 |
| 2013/0152139 | A1* | 6/2013 | Davis | H04N 21/482 725/61 |
| 2013/0152210 | A1* | 6/2013 | Petrovic | G06F 21/10 726/26 |
| 2013/0158984 | A1* | 6/2013 | Myslinski | G06F 17/28 704/9 |
| 2013/0173765 | A1* | 7/2013 | Korbecki | H04N 21/42209 709/221 |
| 2013/0297737 | A1* | 11/2013 | Wajs | G06F 21/10 709/217 |
| 2014/0020025 | A1* | 1/2014 | Anderson | H04N 21/4126 725/43 |
| 2014/0267907 | A1* | 9/2014 | Downes | G06T 1/0071 348/525 |
| 2014/0330414 | A1* | 11/2014 | Chang | G10L 19/018 700/94 |
| 2014/0376723 | A1* | 12/2014 | Petrovic | G09C 5/00 380/278 |
| 2015/0016661 | A1* | 1/2015 | Lord | H04N 21/42203 382/100 |
| 2015/0020094 | A1* | 1/2015 | Moon | H04N 21/478 725/32 |
| 2015/0193899 | A1* | 7/2015 | Oztaskent | H04N 19/46 382/100 |

* cited by examiner

SECOND SCREEN DEVICE AND SYSTEM

This application claims the benefit, under 35 U.S.C. § 119 of European Patent Application No. 13306144.0, filed Aug. 9, 2013 and European Patent Application No. 13306612.6, filed Nov. 26, 2013.

TECHNICAL FIELD

The present disclosure relates generally to (audio) watermarks and in particular to devices interacting with such watermarks.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the recent years, so-called second screen systems have gathered interest. In these, a first device (first or main screen), normally a screen with loudspeakers, renders a content item for which the audio part has been watermarked (or fingerprinted). A second device captures the watermark payload, processes it and performs an action that depends on the watermark payload. A typical action is to download and display auxiliary information that has some relation to the content rendered by the first device. Examples of auxiliary information are statistics relating to a sports event rendered by the first device and a web site that allows the purchase of items that appear in the content item.

It should be noted that the "second screen" is not always a device capable of rendering video, i.e. it is not necessarily a screen. An example of such a solution is a toy that reacts to the content, for instance by laughing at a gag in a cartoon.

Especially in the second case, the second device only reacts to the content directly and not to the user's interaction with the content, which can be perceived as limiting. Therefore, it can be appreciated that there is a need for a solution that can allow a device to react to the user's interaction with content in a second screen system. The present disclosure provides such a solution.

SUMMARY OF DISCLOSURE

In a first aspect, the disclosure is directed to a device comprising: a unit configured to capture a first content rendered by a rendering device; a detector configured to extract payloads of first watermarks from the first content, and not to extract payloads of second watermarks from the first content; an embedder of second watermarks configured to insert watermarks with a payload into a second content to obtain watermarked second content; and a rendering unit configured to render the watermarked second content.

In a first embodiment, at least one of the first watermarks and the second watermarks is an audio watermark. It is advantageous that both the first watermarks and the second watermarks are audio watermarks.

In a second embodiment, the first watermarks and the second watermarks correspond to different watermark technologies.

In a third embodiment, the device further comprises a user interface configured to display information to a user and to receive user input; and a processor configured to: receive the user input from the user interface; cause the user interface to display information in response to received payloads; and send a watermark payload to the embedder of second watermarks. It is advantageous that the user interface is a touch screen. It is also advantageous that the processor is configured to select the watermark payload to send to the embedder in response to the user input. It is further advantageous that the processor is configured to execute an application that is specific to the first content and that causes the user interface to display the information in response to received payloads and to send the watermark payload to the embedder of second watermarks.

In a second aspect, the disclosure is directed to a system comprising a capture and embedding device and a receiver device. The capture and embedding device comprises a unit configured to capture a rendered first content with first watermarks and second watermarks; a detector configured to extract payloads of first watermarks from the first content and not to extract payloads of second watermarks; an embedder of second watermarks configured to insert a second watermark with a payload into a second content to obtain watermarked second content; and a rendering unit configured to render the watermarked second content. The receiver device comprises: a unit configured to capture the first content and the second content; a detector configured to extract payloads of second watermarks, but not payloads of first watermarks; and a processor configured to react to the extracted payloads.

In a first embodiment, the system further comprises a rendering device configured to render the first content.

BRIEF DESCRIPTION OF DRAWINGS

Preferred features of the present disclosure will now be described, by way of non-limiting example, with reference to the accompanying drawings, in which.

DESCRIPTION OF EMBODIMENTS

Figure 1:
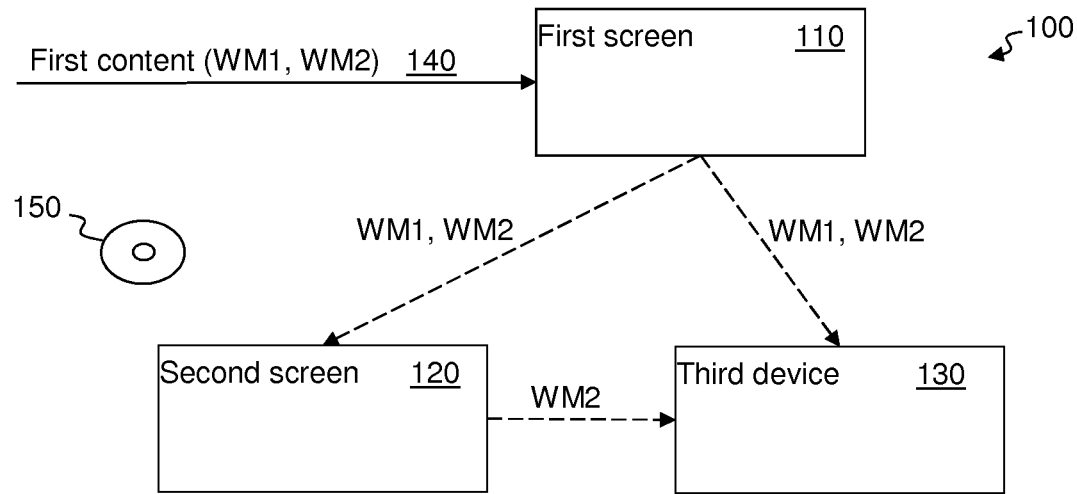
FIG. 1 illustrates an exemplary system according to the present disclosure.

FIG. 1 illustrates an exemplary system according to the present disclosure. The system 100 comprises a first device ("first screen") 110, a second device ("second screen") 120 and a third device 130. The first screen 110, which advantageously is a television set, is configured to receive and render watermarked first content 140. The second screen 120 is configured to capture watermarks of a first type WM1 in the first content 140, whereas third device 130 is configured to capture watermarks of a second type WM2 in this content 140. The second screen 120 is also configured to render received information, embed a watermark in second content (not shown), render the watermarked second content and interact with the user. The third device 130 is configured to react to received and extracted watermarks of the second type WM2. As will be further described hereinafter, the first screen 110, the second screen 120 and the third device 130 each preferably comprise at least one processor (not shown in this figure), memory (not shown in this figure), and other necessary hardware such as cables well known to the skilled person. A non-transitory storage medium 140, such as a CD-ROM or a hard disk, stores instructions of an application (further described hereinafter) intended for execution by the second screen 120.

In a preferred embodiment, the first screen 110 receives the first content 140 that comprises watermarks of the first and the second types WM1, WM2 that preferably have been inserted using two different watermark technologies, the goal being that the second screen 120 is able to extract watermarks of a first type WM1 and insert watermarks of a second type WM2, while the third device 130 is configured to extract only watermarks of the second type WM2. Put another way, each type of watermark then needs its own type of detector for extraction.

Thus, when the first screen 110 renders the watermarked first content 140, it advantageously comprises watermarks of both types WM1 and WM2. While any type of watermark is possible, i.e. both audio and video watermarks, the audio watermark is preferred. The second screen 120 is configured to capture the watermark channel (i.e. audio or video) to extract watermarks of the first type WM1 but not watermarks of the second type WM2 therein and insert watermarks of the second type WM2 in second content. The third device 130 is configured to capture the relevant watermarked channel to extract watermarks of the second type WM2 therein, such watermarks originating from the first screen 110 or the second screen 120.

Figure 2:
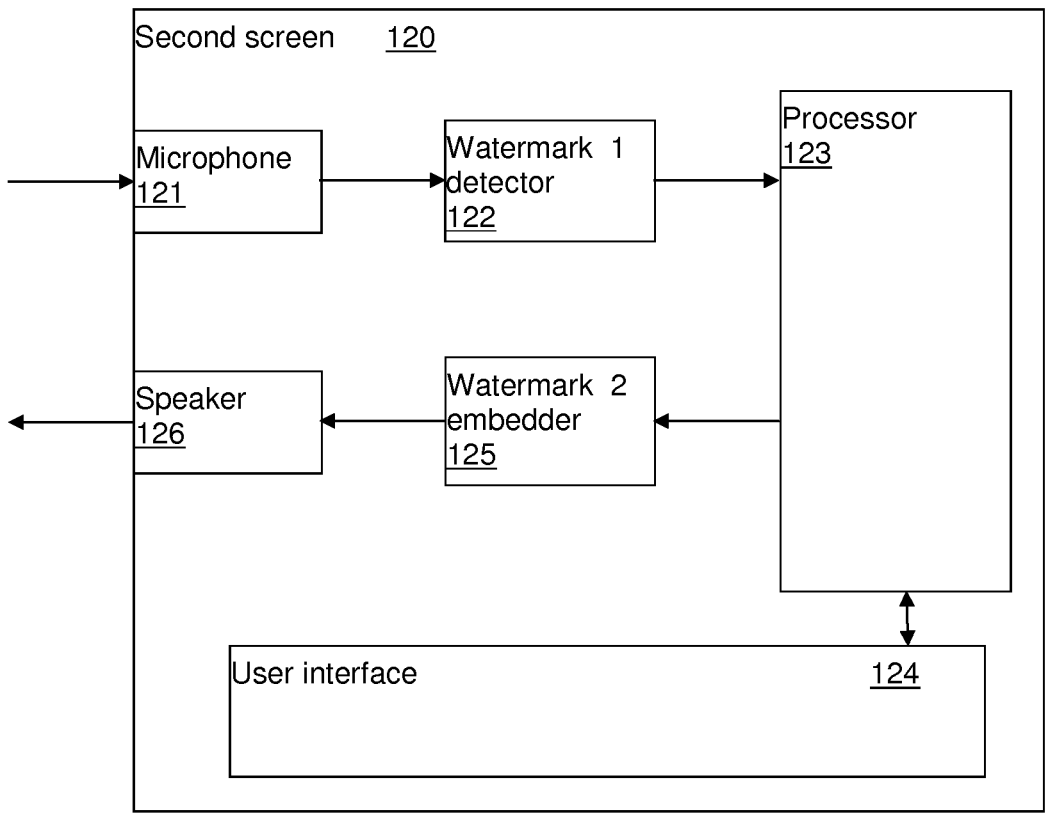
FIG. 2 illustrates a second screen 120 according to a preferred embodiment of the present disclosure.

FIG. 2 illustrates a second screen 120 according to a preferred embodiment of the present disclosure. The second screen 120 comprises a unit 121 for capturing the channel comprising watermarks destined to it; as the preferred embodiment uses audio watermarks, this unit is a microphone. The microphone 121 forwards the captured sound to a detector 122 of watermarks of the first type WM1 that extracts the watermark payload which is forwarded to a processor 123.

The processor 123 is configured to execute an application that advantageously is specific to the content (and thus to the different watermark payloads). This permits specific reactions to the received watermark payloads. The processor 123 is also configured to communicate with a user interface 124, preferably a touch screen, in order to receive user input and to send information to be rendered to the user. The processor 123 is further configured to generate a watermark payload and to send this to an embedder 125 of watermarks of the second type. The embedder 125 is configured to embed the payload as a watermark in the second content, which may be stored locally in the second screen 120 or be retrieved by second screen from a remote server; in the preferred embodiment, the watermark is an audio watermark embedded in audio content. The second content is sent to a renderer 126 of the second content, in the preferred embodiment a loudspeaker.

Thus, the second screen 120 is configured to capture and extract a watermark of a first type, react to the watermark payload, render information to a user and receive user input, and embed and render a watermark of the second type.

Figure 3:
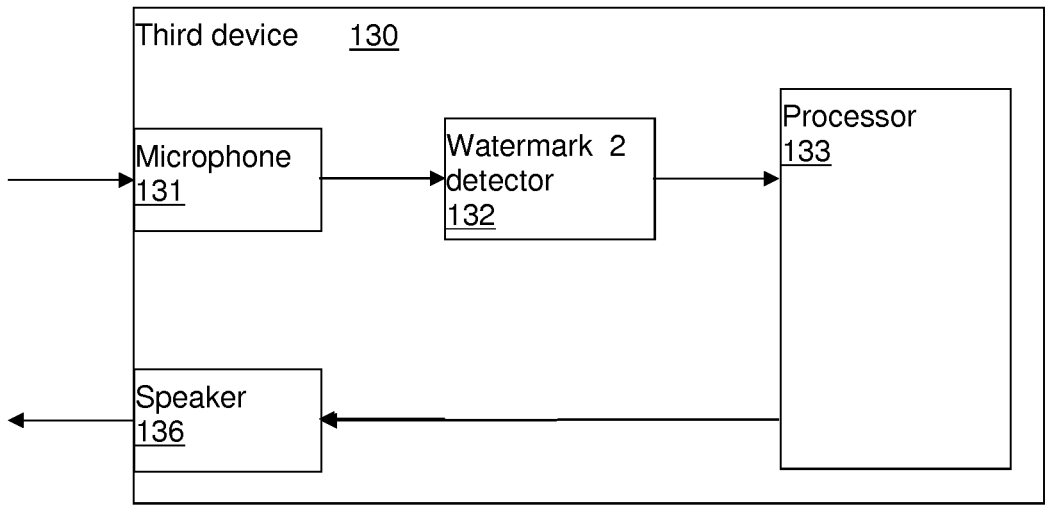
FIG. 3 illustrates a third device 130 according to a preferred embodiment of the present disclosure.

FIG. 3 illustrates a third device 130 according to a preferred embodiment of the present disclosure. As can be seen, the third device 130 can be simpler than the second screen 120. The third device 130 comprises a unit 131 for capturing the channel comprising watermarks destined to it; as the preferred embodiment uses audio watermarks, this unit is a microphone. The microphone 131 forwards the captured sound to a detector 132 of watermarks of the second type WM2 that extracts the watermark payload which is forwarded to a processor 133.

The processor 133 is configured to perform one or more actions in response to a received payload. Examples of such actions comprise different types of movement, but it is preferred that the action is playback of a predetermined audio track. Depending on the payload, the processor then retrieves the corresponding audio track that is sent to a loudspeaker 136 for rendering.

Thus, the third device 130 is able to react to watermarks originating at both the first screen 110 and the second screen 120. Since the watermarks from the second screen can be made to depend upon the actions of the user, the third device is thus indirectly capable of reacting to the actions of the user. It is to be noted that for the purposes of this disclosure, no user input is also considered a user action; in other words, the third device can also react to the absence of user input.

An illustrative and non-limitative example will now further show how the system can work. The example scenario is a broadcast quiz game that requests a user to answer a set of closed questions of varying difficulty. In the example, there are always four possible answers for each question.

The first content 140 comprises watermarks of the first type WM1 that identify the question (advantageously by number: 1, 2, 3, . . . ) when the host asks the question during the show, and a watermark (for instance 0) indicating when the time for answering is up. The first content 140 also comprises watermarks of the second type WM2 that indicate the expected difficulty of the question once the host finished his question (for instance 1 for "easy", 2 for "medium", 3 for "tough" and 4 for "genius"). These values and timelines are defined by an operator when editing the piece of content off-line.

When the host begins to ask a question, the detector 122 in the second screen detects a watermark of the first type WM1 and extracts the payload. This will be the rank of the question. The application reacts by displaying the question and the corresponding potential answers (which may be pre-stored or downloaded on the fly), starting to play back an audio track and waiting for the selection of the user.

When the host stops asking the question, the detector 132 of third device extracts the difficulty of the question. Corresponding to the difficulty, processor 133 retrieves and plays (through the loudspeaker 136) a contextual message. For instance, for 1: "Hey, that's an easy one!", for 2: "This shouldn't be too difficult".

While waiting for the user's answer provided via the user interface 124, the application run by the processor 123 has a set of predefined reactions that it can trigger. Depending on the desired reaction of the third device 130, the application defines a payload that is sent to the embedder 125 of watermarks of the second type WM2 for embedding into the currently played back audio track that is rendered by the loudspeaker 126.

When received by the third device 130, the audio track is captured by the microphone 131, the embedded watermark is extracted by the detector 132 that forwards the payload to the processor 133, which in turn plays a corresponding audio track message via the loudspeaker 136. The following Table 1 gives examples of payload values and corresponding messages:

TABLE 1

Examples of payload values and messages

| Value | Message |
|---|---|
| 10 | "Maybe it's one" |
| 11 | "Maybe it's two" |
| 12 | "Maybe it's three" |
| 13 | "Maybe it's four" |
| 14 | "Are you sure of your answer" |
| 15 | "You're probably right" |
| 16 | "Hurry up" |
| 17 | "Too late!" |
| 18 | "Hurray" |

When the time for answering is up, the watermark detector 122 of the second screen 120 extracts the corresponding payload and passes it to the processor 123. The processor 123 then updates the information rendered by the user interface 124. If the user did not answer in time, the processor 123 can also provide the watermark embedder 125 with payload "17" which would cause the third device 130 to play the message "Too late!"

Figure 4:
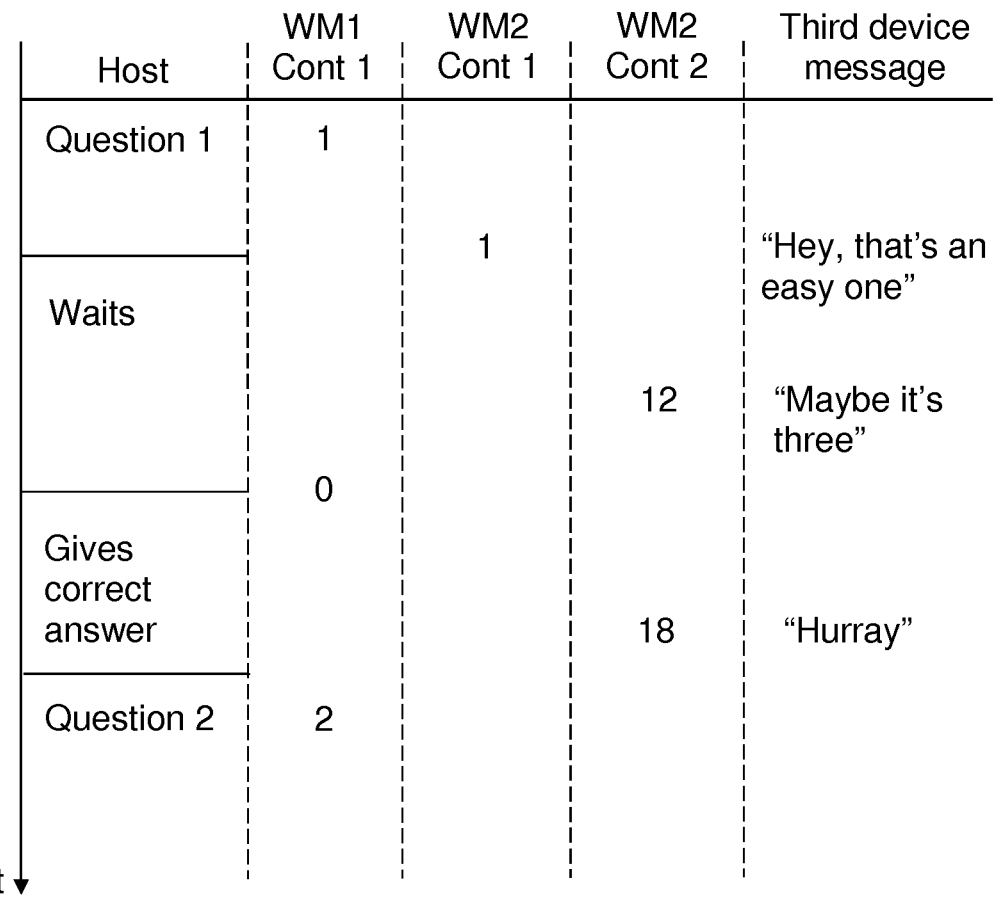
FIG. 4 illustrates an exemplary scenario in which the disclosure is used.

This example scenario is further illustrated in FIG. 4 that shows a timeline in which the time increases downward. At first, the host asks question 1, and the watermark of the first type WM1 comprises the value 1, which indicates that it is question 1. At the end of the question, the watermark of the second type WM2 comprises the value 1, which causes the third device 130 to utter "Hey, that's an easy one!" While the host and the second screen 120 wait for an answer from the user, the second screen embeds a watermark with value 12 in the second content that it diffuses, thus causing the third device 130 to utter "Maybe it's three". At the end of the wait—during which the user provides a response, which in the example is correct—the watermark of the first type WM1 comprises the value 0 to indicate that the time for answering is over. In response to the correct answer input by the user, the second screen 120 embeds a watermark with value 18 into the second content, to which the third device 130 responds with a "Hurray". Then this is iterated with appropriate values through the second and further questions.

In a variant, the watermarks of the first type and of the second type WM1, WM2 are both inserted and extracted using the same watermark technology, which means that both the second screen 120 and the third device 130 are able to extract these watermarks. However, in this case each watermark type corresponds to a set of payload values that is disjunct from one another. In this way, the second screen 120 is able to extract both types of watermark, but it can be made not to react to the watermarks of the second type as the payload value does not correspond to any reaction; for the third device 130, it is then the opposite, i.e. it only reacts to watermarks of the second type. It will be appreciated that it in this case is possible to have a third type of watermark to which both the second screen 120 and the third device 130 react. In this variant, reaction is considered as extraction of the watermarks, while non-reaction is considered as non-extraction of the watermarks.

It will be appreciated that while this description in some places uses the singular for certain features—e.g. 'processor'—the functionality of the feature may naturally be implemented in a plurality of circuits.

It will further be appreciated that the present disclosure can provide a more interactive second screen system.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A device comprising:
a memory;
at least one processor coupled to the memory, the at least one processor being configured:
to capture a first content rendered by a rendering device;
to extract payloads of first audio watermarks of a first audio watermark technology from the first content, and not to extract payloads of second audio watermarks of a second audio watermark technology from the first content;
to insert second audio watermarks of the second audio watermark technology with a payload into a second content to obtain audio watermarked second content; and
to render the audio watermarked second content.

2. The device of claim 1, wherein the at least one processor is further configured to:
display, via a user interface, information in response to received payloads;
receive input via the user interface in response to the information displayed; and
embed a watermark payload based on the input into the second content.

3. The device of claim 2, wherein the user interface is a touch screen.

4. The device of claim 2, wherein the at least one processor is configured to:
execute an application that is specific to the first content; and
cause the user interface to display the information in response to received payloads.

5. A system comprising:
a capture and embedding device comprising first processor circuitry;
a receiver device comprising a second processor circuitry, wherein the first processing circuitry is configured:
to capture a rendered first content with first audio watermarks of a first audio watermark technology and second audio watermarks of a second audio watermark technology;
to extract payloads of first audio watermarks of the first audio watermark technology from the first content and not to extract payloads of second audio watermarks of the second audio watermark technology;
to insert a second audio watermark of the second audio watermark technology with a payload into a second content to obtain audio watermarked second content; and
to render the audio watermarked second content, and the second processing circuitry is configured to:
capture the first content and the second content;
to extract payloads of second audio watermarks, of the second audio watermark technology, but not payloads of first audio watermarks of the first audio watermark technology; and
to react to the extracted payloads.

6. The system of claim 5, further comprising a rendering device with third processing circuitry configured to render the first content.

7. A method comprising:
capturing, by at least one processor, a first content rendered by a rendering device;

extracting, by the at least one processor, payloads of first audio watermarks of a first audio watermark technology from the first content, and not to extract payloads of second audio watermarks of a second audio watermark technology from the first content;

inserting, by the at least one processor, second audio watermarks of the second audio watermark technology with a payload into a second content to obtain audio watermarked second content; and rendering, by the at least one processor, the audio watermarked second content.

8. The method of claim 7, further comprising causing, by the at least one processor, a user interface to display information;

receiving, by the at least one processor, input via the user interface;

causing, by the at least one processor, the user interface to display information in response to received payloads; and embedding, by the at least one processor, a watermark payload into the second content.

9. The method of claim 8, wherein the user interface is a touch screen.

10. The method of claim 8, further comprising selecting, by the at least one processor, the watermark payload to insert into the second content in response to the user input.

11. The method of claim 8, further comprising executing, by the at least one processor, an application that is specific to the first content; and causing, by the at least one processor, the user interface to display the information in response to received payloads.

* * * * *